Sept. 6, 1955 M. L. DOELZ 2,717,361
MECHANICAL FILTERS
Filed Sept. 24, 1951
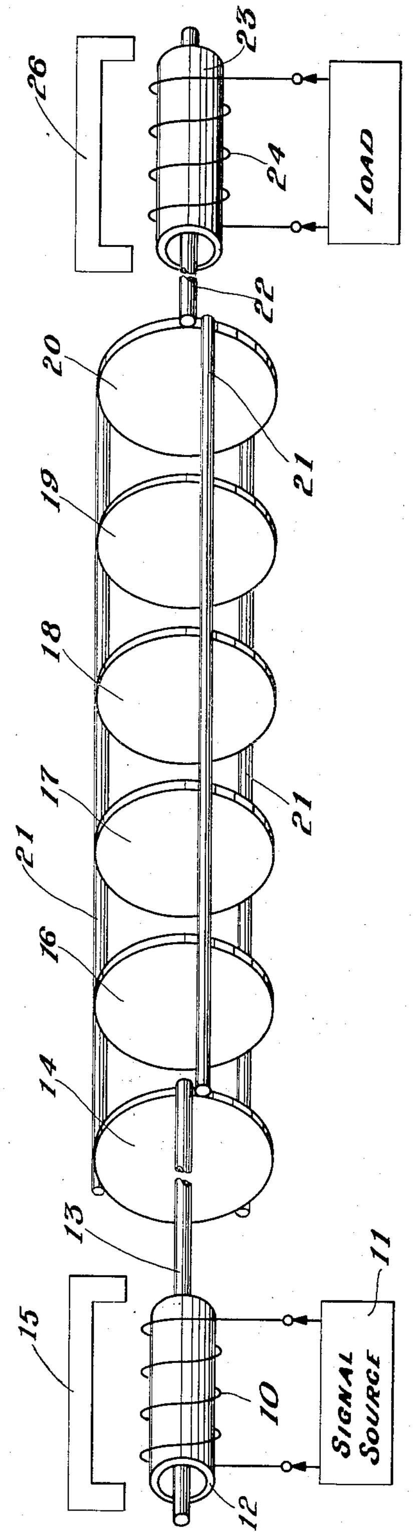
INVENTOR.
MELVIN L. DOELZ
BY Marvin Moody
ATTORNEY Patented Sept. 6, 1955

2,717,361

MECHANICAL FILTERS

Melvin L. Doelz, Los Angeles, Calif., assignor to Collins Radio Company, Cedar Rapids, Iowa, a corporation of Iowa Application September 24, 1951, Serial No. 248,011

4 Claims. (Cl. 333—71)

This invention relates in general to electromechanical filters and in particular to an improved coupling means for an electromechanical filter.

My copending application, Serial No. 70,829, filed January 14, 1949, now Patent No. 2,615,981, issued October 28, 1952, entitled Electromechanical Filters, discloses an electromechanical filter wherein a plurality of discs are coupled together by pins mounted on circular modal lines between the center and outer periphery of the discs. Such filters may be used in electronic circuits as band pass filters and they have very sharp cut off points. The electrical input is fed through magnetostrictive input means and the output is removed through a magnetostrictive output coupling means.

It is an object of this invention to provide an improved electromechanical filter wherein the discs of the filter are joined by a number of rods attached to their peripheries.

Another object of this invention is to provide magnetostrictive input and output means which are attached to the peripheries of the first and last discs of the filter.

Yet another object of this invention is to provide an improved electromechanical filter.

A feature of this invention is found in the provision for a plurality of discs which are joined together by coupling rods attached to their peripheries and which have input magnetostrictive means connected to the peripheries of the first disc and output magnetostrictive coupling means attached to the last disc.

Further objects, features and advantages of this invention will become apparent from the following description and claims when read in view of the drawing, in which The figure illustrates the improved electromechanical filter of this invention.

The figure illustrates a magnetostrictive input means comprising an input coil 10 which is energized by a signal source 11. The winding 10 is wound about a core 12 through which extends a magnetostrictive rod 13. A biasing magnet 15 is mounted adjacent the winding 10. A first disc 14 has the rod 13 connected to its periphery.

A plurality of discs 16, 17, 18, 19 and 20 are joined together by a plurality of metallic rods 21 which extend along their periphery and which are resistance welded, of otherwise connected, to either of the discs. Applicant has discovered that three rods equally spaced about the periphery of the disc make a very satisfactory assembly. The last disc 20 has an output magnetostrictive rod 22 attached to its periphery which extends through a hollow core 23 about which is wound an output winding 24.

A permanent magnet 26 is mounted adjacent the output rod 22. The permanent magnets 15 and 26 provide a predetermined fixed magnetic bias to the magnetostrictive rods 13 and 22. The magnetostrictive principle is well known to those skilled in the art and will not be described herein.

For a more detailed description of this principle, reference may be made to my previously referenced copending application.

The magnetostrictive input and output rods are connected to the discs 14 and 20, respectively, between two of the rods 21 as shown.

As described in the referenced copending application, the thickness and diameter of the discs are primarily responsible for determining the resonant frequency. Applicant has discovered that the following dimensions produce a good filter with a band pass centered about 455 kilocycles per second, with a band width of 2.6 kilocycles at a point 20 db below maximum level. The end discs 14 and 20 are tuned to 455.8 kilocycles and have a diameter of 0.360 inch and a thickness of 0.073 inch. The four mid discs, 16, 17, 18 and 19 are tuned to 455.2 kilocycles and have a diameter of 0.360 inch and a thickness of slightly less than 0.073 inch (the individual discs are tuned by accurately machining them and then hand lapping to the exact frequency. The copending application entitled Frequency Apparatus, Serial No. 172,984, filed July 10, 1950, invented by R. L. Campbell, describes an apparatus which may be used for accurately measuring the frequency).

The coupling wires or rods 21 may be 0.009 inch in diameter and the spacing between surfaces of the discs may be 0.031 inch. The magnetostrictive input and output rods may be 0.005 inch in diameter and 0.510 inch in length. The magnetostrictive input and output rods were purposely detuned and their dimensions were not critical more than ±0.001 inch. If tuned rods are used, their dimensions are critical to ±0.0005 inch.

The discs are made by centerless grinding a rod to the exact outside diameter and cutting them to approximate thickness. They are then heat treated and hand lapped to the correct frequency which is checked by the frequency meter.

The above described filter is analogous to a ladder network in which the elements have a vary high Q which may be in the order of 3000. This allows construction of a filter having a nearly rectangular band pass characteristic. It might be used, for example, in an I.-F. stage of a radio receiver.

The Q obtainable for the elements of such filters is far higher than that obtainable with LC electrical filters and thus much greater selectivity may be obtained with the electromechanical filter than with the conventional electrical filter.

The more discs that are used the more nearly the band pass characteristic approaches a rectangular shape. The center frequency may be varied by changing the dimensions of the discs and the width of the frequency band passed may be varied by changing the diameters and number of the coupling rods 21 and the magnetostrictive elements 13 and 22.

After the filter is assembled as shown in Figure 1, it might be supported from the nodal rings on the end discs 14 and 19. Another possibility is to clamp the discs loosely about their peripheries.

It is seen that this invention provides an improved electromechanical filter giving a very sharp cut-off.

Although this invention has been described with respect to particular embodiments thereof, it is not to be so limited as changes and modifications may be made therein which are within the full intended scope of the invention as defined by the appended claims.

I claim:

1. An electromechanical filter comprising a plurality of discs, a plurality of rods attached to the peripheries of each of said discs, a magnetostrictive input means, an input rod excited by said magnetostrictive input means and attached to the periphery of one of said discs, a magnetostrictive output means, and a magnetostrictive output rod connected to the periphery of another one of said discs and couple to the magnetostrictive output means.

2. A band pass filter comprising, a plurality of discs with thicknesses substantially less than their diameters including a first disc and a last disc, a plurality of rods attached to the peripheries of each of said discs, an input rod attached to the periphery of the first of said discs, magnetostrictive input means coupled to the input rod, an output rod attached to the periphery of the last of said discs, and a magnetostrictive output means coupled to the output rod.

3. An electromechanical band pass filter comprising, a plurality of metallic discs including a first disc and a last disc, a plurality of metallic rods attached to the peripheries of each of said discs, an input metallic rod connected to the periphery of the first of said discs, a magnetostrictive input means coupled to the input rod, an output metallic rod connected to the periphery of the last of said discs, and output magnetostrictive means coupled to the output rod.

4. An electromechanical band pass filter comprising a plurality of metallic discs including a first disc and a last disc, three metallic rods attached to each of said discs about their peripheries, an input metallic rod attached to the first of said discs adjacent one of said plurality of rods, input magnetostrictive means coupled to the input rod, an output rod attached to the periphery of the last disc adjacent one of the plurality of rods, and output magnetostrictive means coupled to said output rod.

References Cited in the file of this patent

UNITED STATES PATENTS

| | | |
|---|---|---|
| 1,678,116 | Harrison | July 24, 1928 |
| 1,933,306 | Berry et al. | Oct. 31, 1933 |
| 2,501,488 | Adler | Mar. 21, 1950 |

FOREIGN PATENTS

| | | |
|---|---|---|
| 839,805 | France | Jan. 7, 1939 |